United States Patent
Lakshmanan et al.

(10) Patent No.: US 9,665,407 B2
(45) Date of Patent: *May 30, 2017

(54) DECENTRALIZED LOAD DISTRIBUTION TO REDUCE POWER AND/OR COOLING COSTS IN AN EVENT-DRIVEN SYSTEM

(71) Applicant: International Business Machines Corporation, Armonk, NY (US)

(72) Inventors: Geetika Tewari Lakshmanan, Cambridge, MA (US); Yuri G. Rabinovich, Palo Alto, CA (US); Robert Jeffrey Schloss, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1055 days.

This patent is subject to a terminal disclaimer.

(21) Appl. No.: 13/892,264

(22) Filed: May 11, 2013

(65) Prior Publication Data
US 2013/0254778 A1    Sep. 26, 2013

Related U.S. Application Data

(62) Division of application No. 12/543,474, filed on Aug. 18, 2009, now Pat. No. 8,479,215.

(51) Int. Cl.
*G06F 9/46* (2006.01)
*G06F 9/50* (2006.01)
(Continued)

(52) U.S. Cl.
CPC ............ *G06F 9/5088* (2013.01); *G06F 9/505* (2013.01); *G06F 9/5094* (2013.01);
(Continued)

(58) Field of Classification Search
CPC ...... G06F 9/5088; G06F 9/505; G06F 9/4893; G06F 9/5094; H04L 29/08144; Y02B 60/142; Y02B 60/162
See application file for complete search history.

(56) References Cited

U.S. PATENT DOCUMENTS 5,031,089 A * 7/1991 Liu .................. G06F 9/5088
                                                709/201
5,539,883 A * 7/1996 Allon ............... G06F 9/5088
                                                370/237
(Continued)

FOREIGN PATENT DOCUMENTS

JP    H0470931 A    3/1992
JP    H0675786 A    3/1994
(Continued)

OTHER PUBLICATIONS

Mulas et al. (Thermal Balancing Policy for Streaming Computing on Multiprocessor Architectures, Mar. 10-14, 2008, 2008 EDAA.*
(Continued)

*Primary Examiner* — Lewis A Bullock, Jr.
*Assistant Examiner* — Kevin X Lu
(74) *Attorney, Agent, or Firm* — Law Offices of Ira D. Blecker, P.C.

(57) ABSTRACT

A computer program product and computer readable storage medium directed to decentralized load placement in an event-driven system so as to minimize energy and cooling related costs. Included are receiving a data flow to be processed by a plurality of tasks at a plurality of nodes in the event-driven system having stateful and stateless event processing components, wherein the plurality of tasks are selected from the group consisting of hierarchical tasks (a task that is dependent on the output of another task), nonhierarchical tasks (a task that is not dependent on the output of another task) and mixtures thereof. Nodes are
(Continued)

considered for quiescing whose current tasks can migrate to other nodes while meeting load distribution and energy efficiency parameters and the expected duration of the quiesce provides benefits commensurate with the costs of quiesce and later restart.

11 Claims, 8 Drawing Sheets

(51) Int. Cl.
*H04L 29/08* (2006.01)
*G06F 9/48* (2006.01)

(52) U.S. Cl.
CPC ...... *H04L 29/08144* (2013.01); *G06F 9/4893* (2013.01); *Y02B 60/142* (2013.01); *Y02B 60/162* (2013.01)

(56) References Cited

U.S. PATENT DOCUMENTS

| | | | |
|---|---|---|---|
| 5,870,604 | A | 2/1999 | Yamagishi |
| 7,941,805 | B2 | 5/2011 | Dillenberger et al. |
| 2005/0038789 | A1* | 2/2005 | Chidambaran ..... H04L 67/1031 |
| 2005/0278520 | A1 | 12/2005 | Hirai et al. |
| 2006/0062150 | A1 | 3/2006 | Felter et al. |
| 2006/0265712 | A1 | 11/2006 | Zhou et al. |
| 2007/0220294 | A1 | 9/2007 | Lippett |
| 2008/0115143 | A1 | 5/2008 | Shimizu et al. |
| 2008/0263386 | A1* | 10/2008 | Darrington ........... G06F 11/203 714/4.11 |
| 2009/0067334 | A1* | 3/2009 | Archer .................... G06F 9/461 370/238 |
| 2009/0083557 | A1 | 3/2009 | Ichikawa et al. |
| 2009/0192981 | A1 | 7/2009 | Papaemmanouil et al. |
| 2010/0153761 | A1 | 6/2010 | Nishioka |

FOREIGN PATENT DOCUMENTS

| | | |
|---|---|---|
| JP | H0816531 A | 1/1996 |
| JP | H09231180 A | 9/1997 |
| JP | 2004126968 A | 4/2004 |
| JP | 2007226567 A | 9/2007 |
| WO | WO2006011189 A | 2/2006 |

OTHER PUBLICATIONS

Mehta et al. Managing intra-operator parallelism in parallel database systems. Proc. of VLDB, 1995.*

Kyu-Sung Park et al., "Process Migration Policies in Distributed Operating Systems" Transactions of Information Processing Society of Japan vol. 31 No. 7 p. 1080-1090, Information Processing Society of Japan, Jul. 15, 1990.

Prosecution History of counterpart foreign patent application, Office Action Oct. 21, 2013, citing background references; Translation of portions of Office Action that apply, discuss, or otherwise mention the references: "This recond of the prior art document search results is not a component of the reasons for rejection."

\* cited by examiner

DECENTRALIZED LOAD DISTRIBUTION TO REDUCE POWER AND/OR COOLING COSTS IN AN EVENT-DRIVEN SYSTEM

RELATED APPLICATION

This application is a divisional of U.S. patent application Ser. No. 12/543,474, entitled "DECENTRALIZED LOAD DISTRIBUTION TO REDUCE POWER AND/OR COOLING COSTS IN AN EVENT-DRIVEN SYSTEM", filed Aug. 18, 2009, now U.S. Pat. No. 8,479,215, the disclosure of which is incorporated by reference herein.

BACKGROUND OF THE INVENTION

The present invention relates generally to data stream processing using multiple nodes, by a plurality of software-implemented tasks, and relates more particularly to load distribution—with the goal of reducing energy costs—by concentrating tasks on a subset of possible nodes, called target nodes, meeting predetermined criteria in terms of load distribution quality (such as anticipated end-to-end throughput time), allowing other nodes without tasks to be quiesced as an economy measure.

With the proliferation of Internet connections and network-connected sensor devices comes an increasing rate of digital information available from a large number of online sources. These online sources continually generate and provide data (e.g., news items, financial data, sensor readings, Internet transaction records, and the like) to a network in the form of data streams. Data stream processing units are typically implemented in a network to receive or monitor these data streams and process them to produce results in a usable format. For example, a data stream processing unit may be implemented to perform a join operation in which related data items from two or more data streams (e.g., from two or more news sources) are culled and then aggregated or evaluated, for example to produce a list of results or to corroborate each other.

However, the input rates of typical data streams present a challenge. Because data stream processing units have no control over the sometimes sporadic and unpredictable rates at which data streams are input, it is not uncommon for a data stream processing unit to become loaded beyond its capacity, especially during rate spikes. Typical data stream processing units deal with such loading problems by arbitrarily dropping data streams (e.g., declining to receive the data streams). While this does reduce loading, the arbitrary nature of the strategy tends to result in unpredictable and sub-optimal data processing results, because data streams containing useful data may unknowingly be dropped while data streams containing irrelevant data are retained and processed.

The majority of known solutions for load distribution in event-driven systems assume that event processing components are stateless. Very few known solutions target stateful operators because migrating stateful operators for load distribution purposes is challenging and expensive. In order to migrate a stateful operator, all data stream processing has to be stopped, all necessary state has to be migrated and all the events routing paths should be updated accordingly. Furthermore, most of these solutions are centralized.

BRIEF SUMMARY OF THE INVENTION

Given that clusters of machines can distribute the workload, a different strategy proposed by the present inventors is to try to use multiple nodes to handle the workload. And if such a strategy is in use during a period when the data stream volume drops, a strategy of moving tasks back to fewer nodes and quiescing some nodes altogether can lower power costs and cooling costs.

The various advantages and purposes of the present invention as described above and hereafter are achieved by providing, according to a first aspect of the invention, a method of decentralized load distribution in an event-driven system, the method including the steps of receiving a data flow to be processed by a plurality of tasks at a plurality of nodes in the event-driven system having stateful and stateless event processing components, wherein the plurality of tasks are selected from the group consisting of hierarchical tasks, wherein a hierarchical task is a task that is dependent on the output of another task, nonhierarchical tasks, wherein a nonhierarchical task is a task that is not dependent on the output of another task, and mixtures thereof; collecting statistics about each task hosted at each node; creating a list of neighbor nodes, using the collected statistics, to which a task can be partially or wholly transferred; selecting at least one node, known as the donor node, to transition into quiescent mode; selecting the tasks at the donor node for consideration to migrate, known as the target tasks, to a neighbor node, known as the target node, from the list of neighbor nodes; choosing the target node to which the target tasks can be migrated wherein the target node meets predetermined criteria in terms of load distribution quality; establishing a load exchange protocol at each node for governing the number of migrations of target tasks, wherein decentralized load migrations lead to overall system load distribution in the event-driven system; migrating the target tasks from the donor node to the target node and transitioning the donor node into quiescent mode.

According to a second aspect of the invention, there is provided a computer program product comprising: a non-transitory computer recordable storage medium having computer readable program code for decentralized load distribution in an event-driven system comprising: computer readable program code configured for receiving a data flow to be processed by a plurality of tasks at a plurality of nodes in the event-driven system having stateful and stateless event processing components, wherein the plurality of tasks are selected from the group consisting of hierarchical tasks, wherein a hierarchical task is a task that is dependent on the output of another task, nonhierarchical tasks, wherein a nonhierarchical task is a task that is not dependent on the output of another task, and mixtures thereof; computer readable program code configured for collecting statistics about each task hosted at each node; computer readable program code configured for creating a list of neighbor nodes, using the collected statistics, to which a task can be partially or wholly transferred; computer readable program code configured for selecting at least one node, known as the donor node, to transition into quiescent mode; computer readable program code configured for selecting the tasks at the donor node for consideration to migrate, known as the target tasks, to a neighbor node, known as the target node, from the list of neighbor nodes; computer readable program code configured for choosing the target node to which the target tasks can be migrated wherein the target node meets predetermined criteria in terms of load distribution quality; computer readable program code configured for establishing a load exchange protocol at each node for governing the number of migrations of target tasks, wherein decentralized load migrations lead to overall system load distribution in the event-driven system; computer readable program code configured for migrating the target tasks from the donor node to the target node and transitioning the donor node into quiescent mode.

BRIEF DESCRIPTION OF THE DRAWINGS

The features of the invention believed to be novel and the elements characteristic of the invention are set forth with particularity in the appended claims. The Figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

Figure 1:
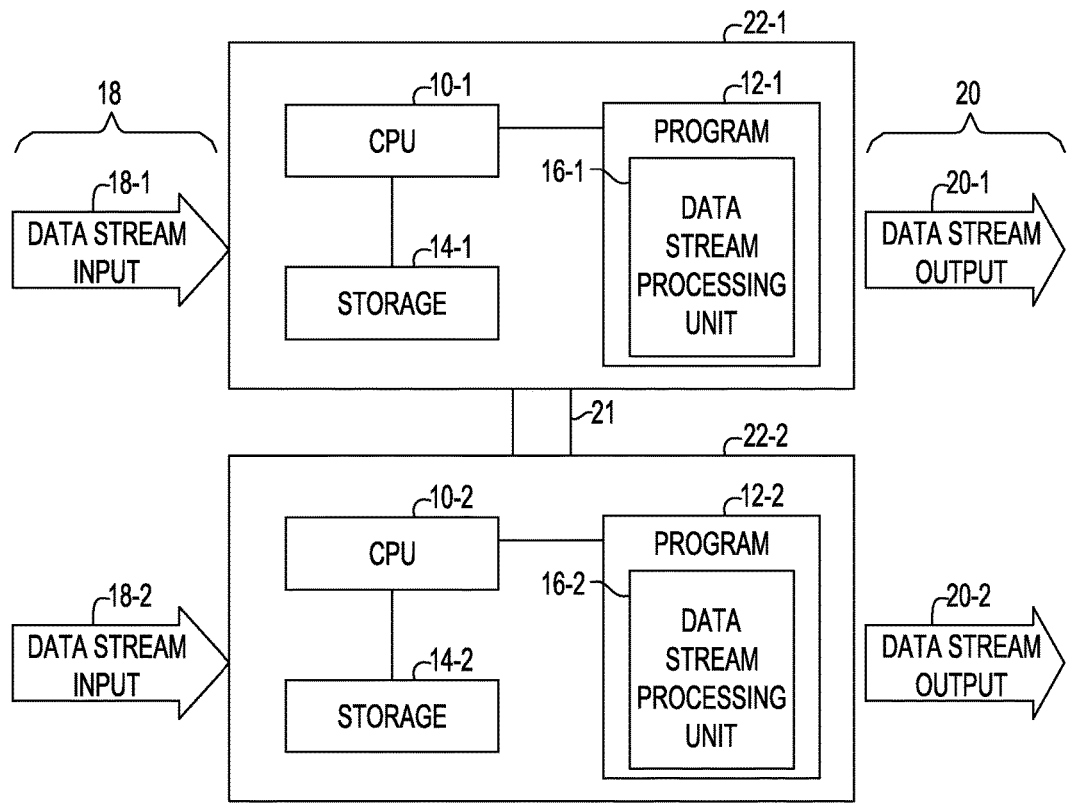
FIG. 1 is a block diagram that illustrates one exemplary hardware environment of the present invention.

The program environment in which a present embodiment of the invention is executed illustratively incorporates multiple connected general-purpose computers or special purpose devices such as a hand-held computer. FIG. 1 is a block diagram that illustrates one exemplary hardware environment of the present invention in which there are two computer systems 22-1, 22-2. It should be understood however that there may be and usually more than two computer systems contemplated in practicing the present invention. A computer system may also be called a machine or node hereafter. The present invention is typically implemented using computer system 22-1, 22-2 comprising Central Processing Unit (CPU) 10-1, 10-2 comprised of microprocessor means, random access memory (RAM), read-only memory (ROM) and other components. The computer may be a personal computer, mainframe computer or other computing device. Resident in the CPU 10-1, 10-2, or peripheral to it, will be a storage device 14-1, 14-2 of some type such as a hard disk drive, floppy disk drive, CD-ROM drive, tape drive or other storage device. Also resident in the CPU 10-1, 10-2 is a fixed amount of internal memory also referred to as RAM whose data units are bytes.

Generally speaking, the software implementation of the present invention, program 12-1, 12-2 in FIG. 1, is tangibly embodied in a computer-readable medium such as one of the storage devices 14-1, 14-2 mentioned above. The program 12-1, 12-2 comprises instructions which, when read and executed by the microprocessor of the CPU 10-1, 10-2 causes the CPU 10-1, 10-2 to perform the steps necessary to execute the steps or elements of the present invention. Program 12-1, 12-2 can be called an Event Management and Load Distribution Management runtime.

The program 12-1, 12-2 loads, starts, controls and steps one or more data stream processing units 16-1, 16-2 which processes an input data stream 18 which may be made up of substreams 18-1, 18-2 to produce an output data stream 20, which may be made up of output substreams 20-1, 20-2.

Computer systems 22-1, 22-2 may also be linked together by physical link 21.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

Further the present invention may be implemented in a cloud computing environment. Cloud computing is a style of computing in which dynamically scalable and often virtualized resources are provided as a service over the Internet or an Enterprise's Internal Network. Users need not have knowledge of, expertise in, or control over the technology infrastructure "in the cloud" that supports them. Cloud computing services usually provide common business applications online that are accessed from a web browser, while the software and data are stored on servers, but data stream event processing could also be executed with some or all of the nodes being part of "the cloud". Because the physical resources in a Cloud may be so geographically distributed that the costs of power to different machines are dramatically different, this invention could have more active use, even when data stream volume is not large, in a cloud configuration.

The present invention pertains to a method, computer program product and program storage device readable by a machine in which there is decentralized load distribution in an event-driven system by migrating one or more tasks, that meet predetermined and user-set criteria that qualifies them as appropriate tasks to migrate, from donor nodes that meet predetermined and user set criteria as nodes that warrant load to be removed from them to one or more target nodes, where the target nodes meet predetermined and user-set criteria that qualifies them as nodes capable of receiving load, and where the end-to-end migration preferably meets predetermined criteria where the total load in the network remains the same or does not increase. The predetermined criteria are initialized by our method and are configurable by the user. The criteria that qualifies a node to initiate task migration from itself, a task for being considered for migration, a node for serving as a recipient of the migrated task, and the decision of whether to migrate is described herein. This criteria relies on statistics including real world attributes (E.g. sensor readings such as actual energy used, or inlet temperatures) that a node collects periodically, in the background, and this load migration decision making process is ongoing, and also conducted periodically after user defined intervals and it may or may not lead to changes in the assignment of tasks to nodes in the network.

The present invention pertains to a dynamic and decentralized computer-implemented method for load distribution between nodes hosting tasks in a task flow, where the data results from processing of one task may serve as the input data to the next task in the task flow. The present computer-implemented method is applicable to nodes in a data center, or nodes that are geographically distributed or to multiple processors on a single machine or to a cloud computing environment. Some objectives of the present computer-implemented method are to distribute load in order to (1) prevent nodes from becoming overloaded, (2) distribute load from overloaded nodes, (3) maintain some quality of service requirements of the application such as minimizing the end-to-end latency, and (4) reduce power/cooling costs.

Some definitional background would be useful in understanding the present invention. "Node" refers to an individual machine, or to a single processor on a multi-processor machine or to a physical entity that does some processing whether it be computing numbers or an engine that generates power and has a computer attached. The nodes could be in a datacenter or geographically distributed. In the present invention, a node either hosts one or more tasks or it does not host any tasks. The processing of tasks may be hierarchical in nature such that the output of one task serves as the input to another task. In addition, a node could be doing a task that is not part of a data flow at a point in time but later does a task as part of a data flow. The first task in the hierarchy conducts processing on data received through some input source. Much of the processing of tasks will be hierarchical in nature but not necessarily so as some tasks for a given application could be non-hierarchical in nature. Data received by a node is referred to as input events, while data generated by a node as a result of processing is referred to as derived events. Examples of data that may require hierarchical processing include stock transactions in financial markets, events inferred by RFID tag readers, temperature readings transmitted from wireless sensors, and intruder detection events detected by monitoring software on communication channels, the supplies status of a coffee machine dispenser, just to name a few.

Figure 2:
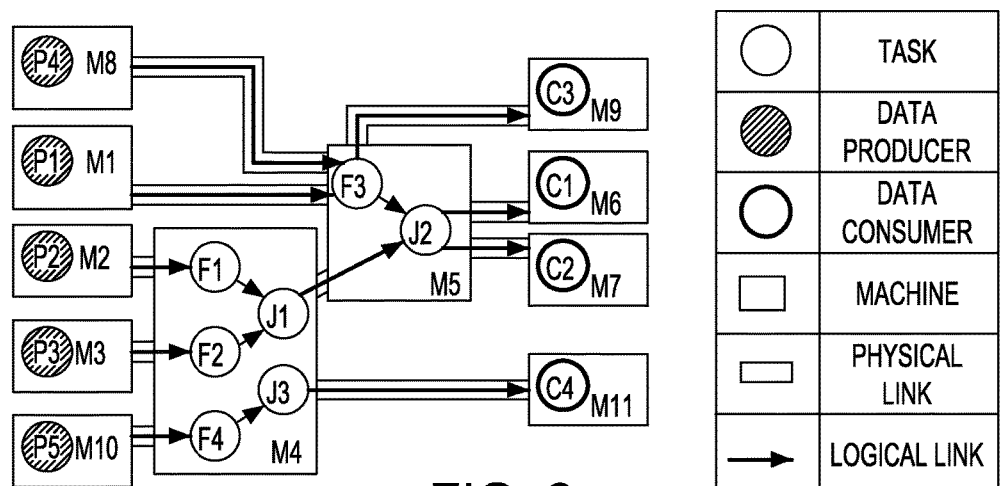
FIG. 2 illustrates a conventional task flow comprising data producers, tasks for processing data, and data consumers.

Referring to the Figures in more detail, FIG. 2 shows an example of a network of machines hosting tasks where the present invention is applicable. A data producer represents a source of data. Example of data include stock quotes, and coffee machine failure alerts. A data consumer represents an entity that is interested in the results of processing performed on this data. Examples of a consumer include a company that repairs coffee machines, or an individual who is interested in the top ten stocks that increased by the highest percentage points in a given day.

A task flow is defined as a sequence of processing of tasks. The processing of tasks may be hierarchical where the data results from processing of one task serve as the input data to the next task in the task flow. Tasks need not be completed before data passes through them to another task. Furthermore, some tasks may be non-hierarchical and do not require data from another task. Some tasks may sometimes require data input from other tasks and at other times will not. In FIG. 2, tasks F1, J1 and J2 are in a common task flow. Similarly, tasks F3 and J2 are part of another task flow.

An upstream node is defined with respect to a given node n as a node that hosts a task that is the parent of a task hosted on node n. In particular, the parent task precedes the child task in the task flow. The parent task, directly or by way of intermediary, produces output which becomes part of the input for the task on node n. In FIG. 2, for example, node M4 that hosts task F1 is an upstream node with respect to node M5 which hosts task J2. A downstream node is defined with respect to a given node n as a node that hosts the child of a task hosted by node n. In FIG. 2, for example, node M5 hosting task J2 is a downstream node with respect to node M4 hosting task J1.

The functionality of the first task in the task flow is to receive data from producers, which are a set of sources of messages. Consumers are interested in the end result of the processing of the tasks on the data. FIG. 2 shows an example of the producers (P1-P5) and consumers (C1-C4) in the task flow. Tasks may retain state after executing on an event or they may not retain any state. Tasks that retain state are referred to as stateful tasks. Those that do not retain state would output the same derived events in roughly the same length of time for a new input event regardless of what the previous input events were, or how many of them there were, or how they arrived over time, or what this tasks previous output events were. Stateless tasks operate independently of what data they received before or what data they produced before. Examples of stateful tasks include:
  a join operator for coalescing financial data streams
  an aggregation operator for monitoring seismic data
  a signal processing operator for military surveillance
  a sequence operator that detects an event e2 occurring immediately after an event e1
  a count operator that counts the number of sell-after-buy operations performed by an individual in one day Tasks that do not retain state are referred to as stateless tasks. Examples of stateless tasks include:
  a task that converts between measuring systems—converting a distance from feet to meters, or a temperature from Farenheit to Celsius;
  a task that replaces identification symbols with other forms of identification symbols—converting a stock exchange ticker symbol to the full legal name of the company whose stock is being referred to;
  a task that adds a field to a message which is a function solely of other fields in that message or is a constant—for example, adding a country field of either USA or Canada depending whether the State or Province abbreviation is one of the 50 US state 2-letter codes or one of the provincial abbreviations;
  a task which adjusts a message field by a constant—replacing a library book checkout date with a library book due back date which is always 3 weeks after the date of checkout.

Tasks are often referred to as operators. It should be understood that "tasks" and "operators" are interchangeable terms and both are used throughout herein.

Figure 3:
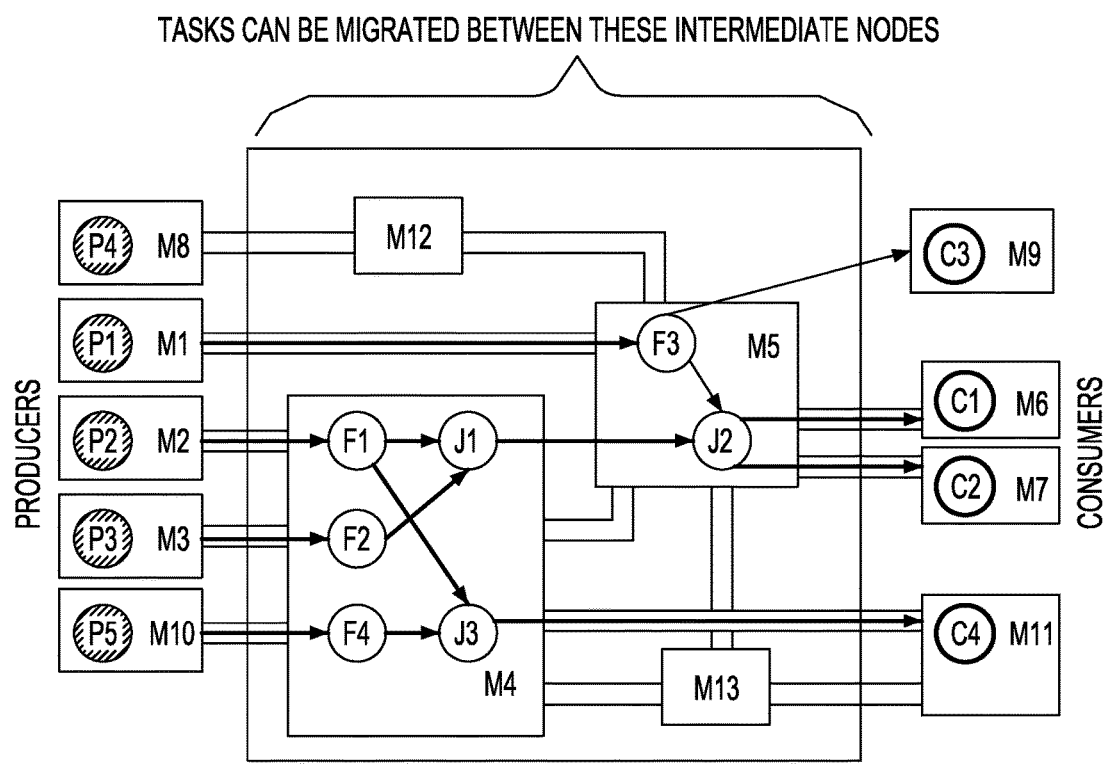
FIG. 3 illustrates a conventional load distribution problem.

Referring now to FIG. 3, there is illustrated a load distribution problem. Load may be migrated to a node that is not doing any processing such as nodes M12 and M13 in FIG. 3, or load may be migrated to nodes that are already processing other tasks, such as node M5 which is processing tasks F3 and J2. FIG. 3 also indicates the characteristics of a dynamic load distribution problem, namely:
  Nodes may go down or new nodes may be added to the network during runtime;
  Data rates may vary arbitrarily;
  Tasks may terminate and be removed from the task set, or new tasks may be added anytime;
  Tasks may be split into two or more parts during runtime.

When considering whether to migrate load, the present computer-implemented method considers one single task, a group of tasks or a split task as the load.

The present computer-implemented method takes into account whether tasks retain state, which could be in the form of data stored on disk or in the main memory of the node hosting the task. When deciding to migrate stateful tasks, the present computer-implemented method takes into account the speed of the data transportation links between the donor node hosting the stateful task to be migrated (the target task) and recipient node receiving the stateful task (target node).

The present computer-implemented method also considers the data flow between tasks before migrating tasks in order to prevent cycles and meet quality of service requirements of the application such as minimizing the end to end response time of the application.

The present computer-implemented method also considers the workload anticipated by tasks before migrating tasks in order to prevent nodes from over heating when their workload peaks in a particular pattern. The anticipated workload information is available through the statistics that a node records and calculates. A node can perform some statistical analysis whereby the node can calculate the mean and variance of data arrivals and use curve fitting to suggest the distribution of input arrival events. On the basis of this analysis a node can determine a pattern in the arrival rate of its input data and determine the duration of the period it can go into quiescent mode.

While making the decision of which load to distribute, the present computer-implemented method also considers the relationship between the load correlations of different tasks, which is referred to as the load correlation coefficient. The load correlation coefficient ensures that the present computer-implemented method transports the target task away from a node whose load peaks at the same time as other tasks hosted by that node, and moves it to a node which hosts tasks whose load does not peak at the same time as the target task's load.

Before migrating a target task, the present computer-implemented method considers whether migration of the target task will be a good decision for the donor and target nodes by estimating, given some assumptions, the post-migration utilization of the donor and target nodes. In addition to utilization, the present computer-implemented method in an embodiment of the present invention can also estimate the post migration inlet temperature of the donor and recipient nodes, and thus provide reductions in cooling costs by advocating load migrations that would lower the temperature of a donor node without increasing the temperature of a recipient node above an acceptable threshold.

In addition to migrating a single target task, the present computer-implemented method considers a plurality of possible ways in which a target task can be split, and therefore considers migrating one or multiple portions of a target task.

Since the present computer-implemented method is a decentralized method, a protocol is defined for load distribution that all nodes must follow in order to ensure that local load migration decisions do not conflict with each other.

Before considering migration, the present computer-implemented method in an embodiment of the present invention also considers whether certain nodes in the network should transition to quiescent mode in order to save energy. The decision about when to transition into quiescent mode can be made anytime dynamically during the runtime while nodes are conducting processing on input data and before or after load distribution decisions are made. Load migration and quiescing decisions must not occur simultaneously as they may provide conflicting results. Therefore, the one decision (load migration or quiescing) may be considered before or after the other (quiescing or load migration) is completed. However, once a decision to quiesce a node is made, no further inputs are sent to any tasks running on that node, so that once those tasks produce their output, the quiesce does not take "offline" any part of the event flow. The new node where the task will be running receives all further inputs for this task. For stateless tasks, the new task could begin processing the next input before the old task finished its input, but for stateful tasks, the new task must not begin processing the next input event until the task state from the old node has been fully transferred. This transfer is part of the Load Exchange Protocol (described later).

During the process of transitioning to quiescent mode, some tasks may be migrated mid-completion. This means that at the time that they are moved they have generated some output but they may generate more output in the future at their new location.

The present computer-implemented method is dynamic which implies that the decision about when to transition into quiescent mode can be made anytime dynamically during the runtime while nodes are conducting processing on input data. A node's decision to transition to quiescent mode entails a preliminary set of decisions regarding:

How long to be in quiescent mode;

The anticipated workload through the period of being in a quiescent state;

Whether to suspend tasks and process them later or whether to migrate tasks to more efficient nodes that can process them more efficiently during the quiescent mode period; and Which other neighboring nodes can transition to quiescent mode.

These initial considerations are followed by a detailed analysis of the benefits and costs of transitioning to quiescent mode. The costs of such a transition include:

the total power cost associated with a transition including (1) the power cost to a node of transitioning into quiescent mode, (2) transitioning from quiescent mode back to active mode, and (3) the power cost of any other nodes which receive migrated tasks from this node and may transition from quiescent mode to active mode as a result of receiving these tasks.

time to stop task processing and if applicable, resume it on a new target machine;

the cost of migrating any state associated with the tasks to be migrated to the target machine; and time to move state back and resume processing on the original host machine processing the task.

The benefits of transitioning to quiescent mode include:

the projected energy savings impact of transitioning to quiescent mode and the amount of time spent in quiescent mode; and the improvement in the application's quality of service resulting from putting nodes into quiescent mode and migrating tasks to appropriate recipient nodes.

If the benefits of transitioning to quiescent mode outweigh the costs, a node initiates the transition. The computer-implemented method regarding transitioning into quiescent mode can be implemented as a decentralized method. Alternatively, a central controller that commands knowledge of the resource availability in the entire network may control the quiescent mode transition process in a centralized manner.

Figure 4:
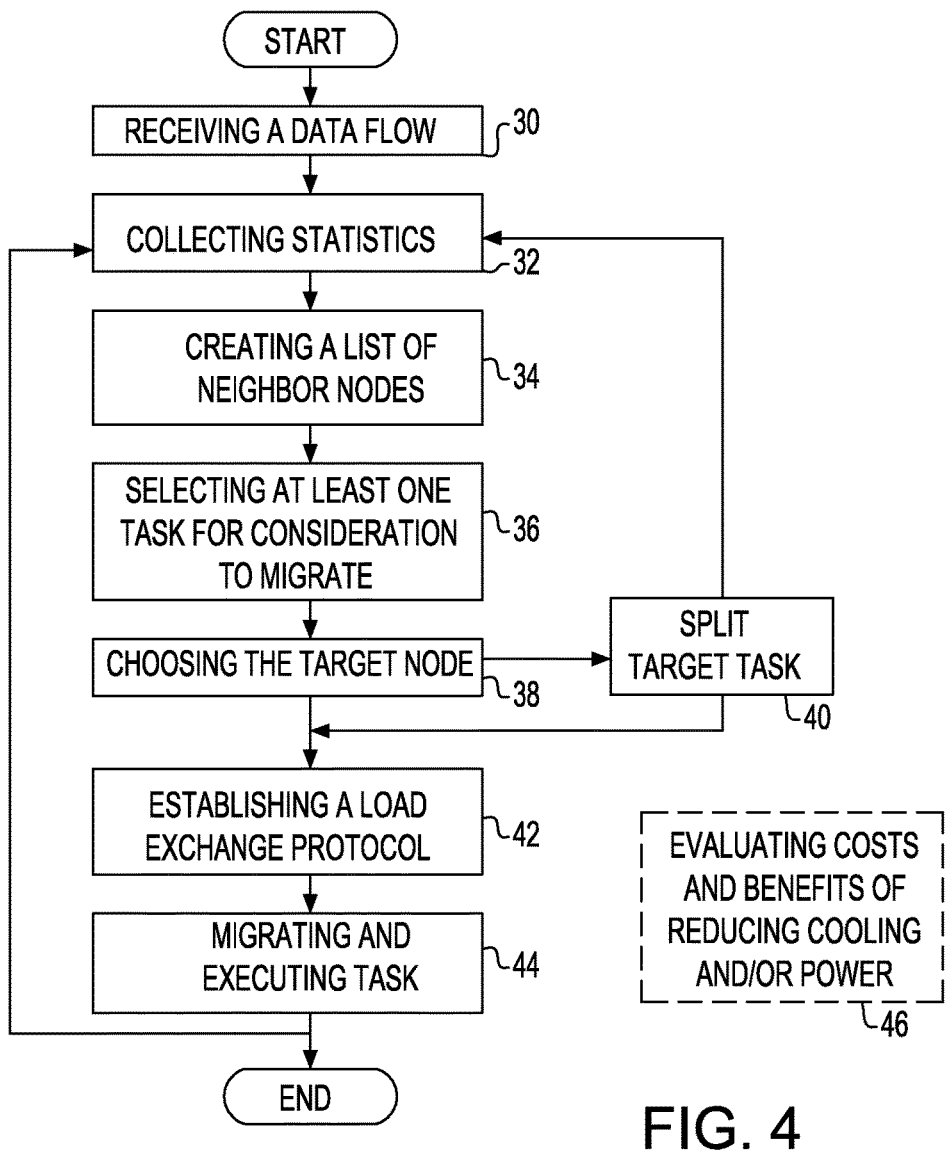
FIG. 4 is a flow chart illustrating a preferred embodiment of the computer-implemented method according to the present invention.

The computer-implemented method according to the present invention now will be discussed in detail. The process is decentralized in that each node practices the process steps to be discussed. A flow chart illustrating the computer-implemented method according to the present invention is shown in FIG. 4.

Step 1: Receiving Input Data.

The first step of the computer-implemented method (block 30) includes receiving a data flow to be processed by a plurality of tasks at a plurality of nodes in the event-driven system which has stateful and stateless event processing components. The plurality of tasks may be hierarchical tasks, nonhierarchical tasks or combinations thereof.

Step 2: Nodes Collect Statistics.

In the next step of the computer-implemented method, each node periodically collects some statistics (block 32) about each event processing component (also referred to as task or operator) it is hosting. These statistics include:

Load per task: This could be defined as the CPU utilization per task or as the number of rules evaluated per task or whatever definition the user provides in the context of the system.

Memory occupied by a task: It is assumed that all state associated with the task is resident in memory (not on disk). If the task is migrated, this memory needs to be transported as well.

Network Usage of the link connecting the node hosting the target task and another node: The network usage (u(l)) is the amount of data that is in transit over a link l at a given instant.

$$u(l) = \left(\sum_{f \in F_l} DR_f(l)\right) \text{Lat}(l)$$

where F is the set of event flows over link l, $DR_f(l)$ is the data rate of flow f over link l, and Lat(l) is the latency of the link l. This metric gives one an idea of how busy link l is and is necessary to estimate how long it will take to migrate task associated state from one node to another.

In an embodiment of the present invention, the statistics include the heat characteristics of the node hosting a task.

In an embodiment of the present invention, the statistics include the rate at which data streams to the task, and any recurring pattern in the incoming data rates that is based on time or on the type of task hosted by the node.

The collection of statistics about each task occurs in the background while the task is executing.

The node will maintain a time series of the numeric statistics, and periodically compute their mean, variance and standard deviation. After every HISTORY_NUMBER_OF_INTERVALS_TRACKED, the node will delete the HISTORY_INTERVAL_COUNT_CLEANUP_SIZE oldest entries of each time series, and make space for new entries.

Step 3: Create Load-Exchange Neighbors List.

The next step of the process is creating a list of neighbor nodes to which a task can be partially or wholly transferred (block 34). After periodic statistics exchange from its neighbors, each node maintains a list of load balancing partners. The node sorts this list and the neighbor nodes are ordered in descending order in terms of total available load and memory.

In an embodiment of the present invention wherein cooling costs are considered, the list of neighbor nodes is refined by removing partners that have very high cross-interference heat coefficients with the current node. That is, each node has access to a cross-interference matrix of size n-by-n where n is the total number of nodes in the data center. An entry a_ij in this matrix represents the amount of heat node i contributes to node j. A node refers to this matrix, and refines its list of nearest neighbors by removing nodes with which it has very high cross interference heat coefficients. When a node wishes to initiate load migration, the node simply refers to the list of neighbor nodes to select a potential load exchange partner node. The decision to consider load migration could be implemented as an episodic event that recurs at regular interval within each node, or it may be triggered by the violation of some threshold such as minimum required power savings or maximum cooling costs or maximum node utilization or minimum node utilization. The precise trigger that leads to consideration of step 4 onwards in the computer-implemented method of the present invention can be configured individually for each node by the user. Alternatively if the network is very large (E.g. thousands of nodes) a user may initialize the load migration trigger settings for a subset of the nodes, and rely on autonomic, decentralized information propagation algorithms such as basic diffusion or belief propagation for the initialized nodes to spread their initialized values to other nodes for which those thresholds are appropriate. Diffusion is a technique in which a net transport of information results from a set of nodes in the network where it is highly concentrated to a set of nodes which have little or none of the information. The result of diffusion is a gradual mixing of information. Under certain conditions, based on purely self-initiated local coordination of nodes, the diffusion process will eventually result in complete mixing of information in the network. In this embodiment we implement the load migration decision as an episodic event which occurs after an interval of length LOAD_DISTRIBUTION_INTERVAL, which is the installation's parameter. Parameters such as these could be configured individually for each node by the user or configured automatically and set through diffusion-based protocols (discussed further on in the embodiment).

Step 4. Select a Task for Migration.

The next step of the process is selecting at least one task at a node (i.e., the target task) for consideration to migrate to a neighbor node (i.e., the target node) to distribute the system load of processing the target task (block 36). If there are both stateful and stateless tasks, it is preferred to migrate stateless tasks first since there will be less load to distribute. If there are only stateful tasks hosted on a node, then one of them with the least amount of in-memory state is selected for migration. With respect to stateful tasks, state can be on disk and in memory. It is generally preferred to migrate stateful tasks which only have state in memory. It may happen that a single task uses more than the preset STATE_MIGRATION_LIMIT to migrate as a single task. In this situation, an optional step of the process is to split the target task into two target subtasks to migrate. Splitting of tasks will be discussed in more detail hereafter. By taking into account the amount of state of a task, the type of state (on disk or in memory) and the speed of the link(s) via which to migrate state from a donor to a recipient node, the computer-implemented method of the present invention handles both stateful and stateless tasks, unlike many existing load migration techniques. The actual migration of state could be optimized in a number of ways described in existing work.

Step 5: Select a Target Node.

The next step of the process is choosing the target node to which the target task can be migrated wherein the target node meets predetermined criteria in terms of load distribution quality (block 38). The node eliminates potential load exchange partners from the list that do not satisfy the minimal requirements (criteria) for serving as the new host for the target task.

In the embodiment of the present invention where cooling costs are reduced, this step of choosing the target node may depend entirely on reducing cooling costs, if reducing cooling costs is a major factor, rather than if the target node meets the predetermined criteria in terms of load distribution quality. Further, in one preferred embodiment, this step of choosing the target node may consider reducing cooling costs in addition to the target node meeting the predetermined criteria in terms of load distribution quality.

The predetermined criteria include: the physical connections of the target node, available load and memory of target node, minimizing the number of physical links, eliminating cycles, target node load correlation, and post-migration utilization of donor node and target node. At least some of these criteria should be met for selecting the target node. In a preferred embodiment, all of these criteria should be met for selecting the target node. Each of these criteria will be discussed in detail.

Figure 5:
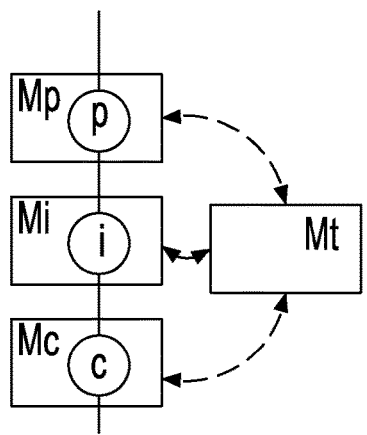
FIG. 5 illustrates the criteria for the physical connections of the target node.

As shown in FIG. 5, the criteria for the physical connections of the target node is illustrated. The target node, Mt, must be physically connected to the node, Mp, hosting the parent task, p, and to the node, Mc, hosting the child task, c, of the target task i hosted on node Mi. The target node, Mt, must also be connected to the node, Mi, currently hosting the target task i. This particular criteria becomes clearer with reference to FIG. 3. As an example, it is desirable to migrate task J1, currently hosted by node M4, to another node. In this case, task J1 is the target task. Node M2 or M3 can be the parent node, M4 is the donor node (Mi) and node M7 is the node Mc hosting the child task. With this scenario, the target task J1 can be migrated to M5 or M13, both of which are connected (directly or indirectly) to the parent node, child node and donor node.

The next criteria is available load and memory of target node. The target node must have sufficient available load and memory to host the target task. The collection of statistics discussed above is used to evaluate the available load and memory. Furthermore, the physical machine link between the target node and the donor node currently hosting the target task must not have a very high network usage if the target task is stateful and has in-memory state. The more heavily utilized the link, the longer it will take to move state from the donor node to the target node.

Figure 6:
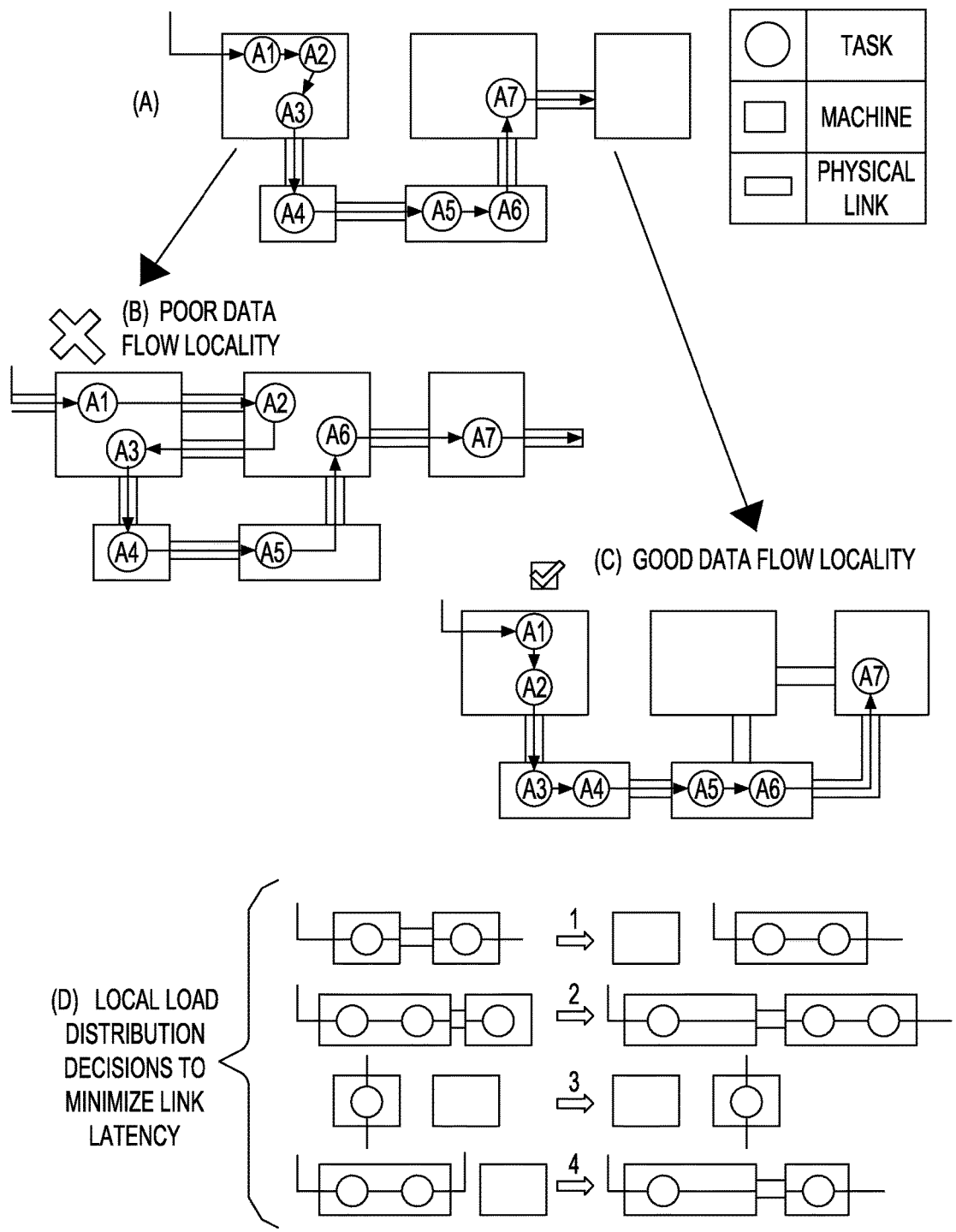
FIG. 6 illustrates the concept of minimizing physical connections between nodes.

It is desirable to minimize the number of physical connections that connect the target node to the nodes hosting the parent and child tasks of the target task. Physical links increase end-to-end latency. An application's quality of service requirements may include low end-to-end latency. Therefore, minimizing the number of physical connections is important for meeting an application's quality of service requirements. The list of target nodes should be sorted in terms of the number of physical connections they maintain with the target task to be migrated. FIG. 6A illustrates an example of a task flow. FIG. 6B shows an example of load migration that increases the number of physical links in the flow, and is therefore undesirable. FIG. 6C shows an example of load migration that decreases the number of physical links in the flow, and is therefore desirable. FIG. 6D shows the local sets of load migration decisions that a node can make and how they impact the number of physical links. Decisions 1 and 2 in FIG. 6D improve (lower) the number of physical links, whereas decision 4 makes it worse, and with decision 3, the number of physical links stays the same.

Figure 7:
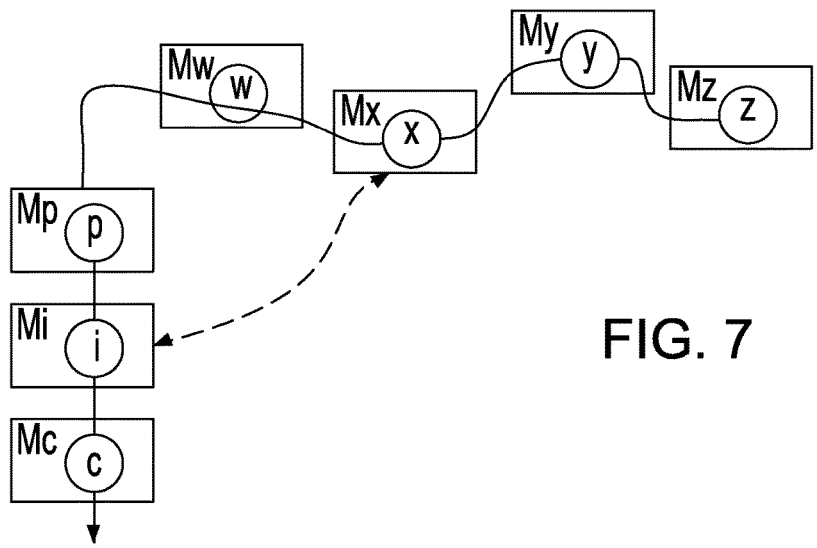
FIG. 7 illustrates the concept of avoiding cycles in the task flow.

The next criteria is eliminating cycles. A cycle occurs when the messages flowing out of one task go to other tasks whose output, directly or indirectly, is an input to the one task. If the target node is hosting tasks that represent predecessors in the flow of the target task, then it should be eliminated. This situation is shown in FIG. 7 wherein node Mx is an undesirable target node for target task i because it hosts tasks that are predecessors in the flow of task i.

The next criteria is target node load correlation. In addition to looking at average load on the target node, the load stability should also be examined. It has been demonstrated in published work [Xing, ICDE'05, supra] that it is not sufficient to simply take into account the average load on a target node before migrating tasks to this node. One must also examine the load variation on the node. In particular it would be useful if the load correlation coefficients between tasks on a node are negative. A negative load correlation coefficient between two tasks implies that when the load of one of the tasks peaks, the load of the other task does not. Therefore the calculation of load correlation coefficients between the target task being migrated and the tasks on the recipient machine are incorporated into the load migration decision making process.

i. $\rho(a,N)$: Correlation coefficient between the load time series of task a and the total (sum of) load time series of all tasks on N except a.

ii. From the point of view of a donor node, N1, it is good to move out a task that has a large $\rho(a,N1)$ and from the point of view of a recipient node, N2, it is good to accept a task that has a small $\rho(a,N2)$.

iii. Thus it is preferred to move tasks with large values of $\rho(a,N1)-\rho(a,N2)$. We refer to this as the score.

iv. We compute the correlation coefficients for task a with respect to all potential target nodes and select the node with the largest score as the target node.

Given a load time series $S=(s_1, s_2, \ldots, s_k)$ with k elements, its mean and variance are defined as follows:

$$E(S) = \frac{1}{k}\sum_{i=1}^{i\leq k} s_i$$

$$\mathrm{var}(S) = \frac{1}{k}\sum_{i=1}^{i\leq k} s_i^2 - \left[\frac{1}{k}\sum_{i=1}^{i\leq k} s_i\right]^2$$

Given two load time series, $S_1=(s_{11}, s_{12}, \ldots, s_{1k})$ and $S_2=(s_{21}, s_{22}, \ldots, s_{2k})$, their covariance $\mathrm{cov}(S_1,S_2)$ and correlation coefficient $\rho$ are defined as:

$$\mathrm{cov}(S_1, S_2) = \frac{1}{k}\sum_{i=1}^{i\leq k} s_{1i}s_{2i} - \left(\frac{1}{k}\sum_{i=1}^{i\leq k} s_{1i}\right)\left(\frac{1}{k}\sum_{i=1}^{i\leq k} s_{2i}\right)$$

$$\rho = \frac{\mathrm{cov}(S_1, S_2)}{\sqrt{\mathrm{var}S_1} \cdot \sqrt{\mathrm{var}S_2}}$$

In a preferred embodiment, the load correlation coefficient ρ should be positive for the donor node, indicating unfavorable load correlation and thus ripe for migration, and negative for the target node, indicating favorable load correlation for the target task migration to the target node.

The last criterion is post-migration utilization of the donor node and the target node. If it is assumed that the event traffic will remain the same for the duration of the migration decision process for a task, the current load statistics can be used to estimate the post migration utilizations of the donor node and target node. The post migration decrease in utilization of the donor node should be significant enough, i.e. greater or equal to the preset LOAD_DECREASE_THRESHOLD and the post migration increase in utilization of the target node should not be above an acceptable threshold, preset LOAD_INCREASE_THRESHOLD to warrant the migration of the task.

CPU utilization is considered as the system load. The load of nodes and tasks is measured over fixed length time periods. The statistics collection running in the background is useful for this purpose. In each period the load of a task is defined as the fraction of CPU time needed by that task over the length of the period. If the average event arrival rate in period i for task a is ②(a) and the average event processing time of a is p(a), then the load of a in period i is ②(a)·p(a). Thus the post migration utilization, $U_d$, of the donor machine and $U_r$ of the recipient machine after migrating a task a1, and where $n_d$ and $n_r$ are the total number of tasks on the donor and recipient respectively, is:

$$U'_d = U_d \left(1 - \frac{\lambda(a1)p(a1)}{\sum_{i=1}^{i \leq n_d} \lambda(ai)p(ai)}\right)$$

$$U'_r = U_r \left(1 + \frac{\lambda(a1)p(a1)}{\sum_{i=1}^{i \leq n_r} \lambda(ai)p(ai)}\right)$$

Migration should take place if the post migration utilization of the donor node is less than a preset LOAD_MAX_THRESHOLD, and the post migration utilization of the target node is less than a preset LOAD_MAX_THRESHOLD. If these requirements are not met, then the node may optionally try splitting the target task and seeing whether the split task leads to good post migration utilizations. Splitting is described next (block 40, FIG. 4). If splitting does not lead to success, the node will go back to computing the target node correlation coefficient described above, and continue selecting a new target node and repeating task splitting if necessary. If no potential target nodes are found, the computer-implemented method will time out after a given time interval and start over with statistics collection as described previously.

If the target task is very large, it can be split. Splitting can be of different types. For purposes of illustration and not limitation, three methods for task splitting are described below. The method of splitting is driven by the type of task. There are other ways of splitting in addition to the ones we describe below.

Figure 8:
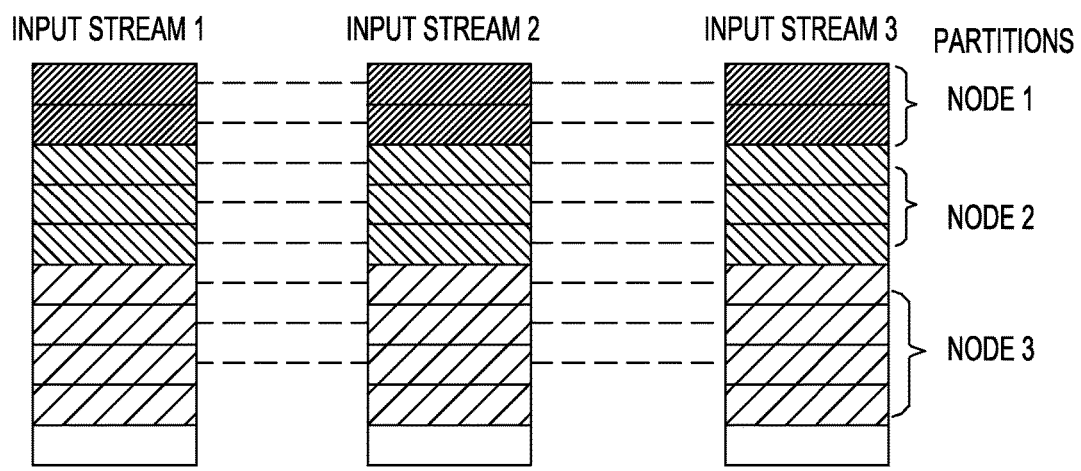
FIG. 8 illustrates one method of splitting tasks.

Splitting of the tasks can be by partition ID as illustrated in FIG. 8. The input stream can be partitioned according to the partition ID. If there are multiple input streams for the same task, the partitions with the same partition ID are grouped across all input streams of the task as the smallest unit to be adapted. Thus we can split the input streams and redirect partitions with the partition ID to different nodes.

Splitting of the tasks can be by context. Depending on the type of task, it may be impossible to split as described by partition ID. For instance we may want to split by context. As an example, suppose a task processes all events for customers who buy items online from January through June. This task can be split into two contexts where one context is customers that buy from January to March and another context is customers who buy from April to June. The same rules in these two contexts can be evaluated in parallel on different nodes. Effectively, the incoming data stream is split amongst two nodes, and data pertaining to a particular month is redirected to the appropriate node.

A third choice is splitting of the tasks by rule. Suppose a task does several things, such as "Detect sale of apples, and return of oranges." Effectively, this task is executing two rules, where one rule is "Detect sale of apples", and the second rule is "Detect returns of oranges." Thus, this task can be split into two rules, and processed in parallel. In this case the incoming data stream is replicated in full and redirected to the two nodes processing these two rules in parallel.

Cooling Cost Savings Goal

The donor node might want to migrate a task that has significant load because migrating such a task will lead to potentially significant savings in energy spent on the cooling of the donor node [as indicated by block 46 in FIG. 4],. In a further embodiment we first select a potential target node that satisfies one or more of the aforementioned criteria for qualifying as a target node and in addition reduces cooling costs. This embodiment of the present invention may be incorporated into step 5 of selecting a target node [block 38 of FIG. 4]. This embodiment of the present invention comprises computing the outlet temperature, $T_{out}^i$, of the recipient node i assuming hypothetically that the task is migrated there. This can be calculated as follows: node i consumes power at the rate $P_i$ while performing the task set $C_i$:

$$P_i = G_i(C_i)$$

The power function $G_i$ takes into account factors such as how often the node has to access the disk for reading and writing as a result of processing a task in task set $C_i$.

Each node is fan draws cold air over the node i at the flow rate $f_i$ and inlet temperature $T_{in}^i$, and dissipates heated air with average outlet temperature $T_{out}^i$. According to the law of energy conservation and the fact that almost all power drawn by a computing device is dissipated as heat, the relationship between power consumption of a node and the inlet/outlet temperature can be approximated as:

$$P_i = \rho f_i C_p (T_{out}^i - T_{in}^i)$$

where $C_p$ is the heat of air and $\rho$ is the air density. Thus the power consumption of the node i will cause the air temperature to rise from $T_{in}^i$ to $T_{out}^i$. Having computed $P_i$, we can solve for $T_{out}^i$ as follows:

$$T_{out}^i = \frac{P_i}{\rho f_i C_p} + T_{in}^i$$

The hypothetical post migration outlet temperature of the donor node should also be computed using the same calculations above, given that the task to be migrated is removed from the task set $C_i$ hosted by the donor. The proposed load migration should generate enough cooling cost savings for the donor node to warrant the migration. The decrease in the hypothetical post-migration temperature of the donor node should be greater than or equal to to the installation's parameter known as TEMPERATURE_DECREASE_THRESHOLD to warrant the migration. Parameters such as these could be configured individually for each node by the user or configured automatically and set through diffusion-based protocols (discussed further on in the embodiment).

If the estimated increase in the post-migration outlet temperature of the recipient node is higher than the TEMPERATURE_INCREASE_THRESHOLD, a preset heat threshold, the task should be split and the outlet temperature recomputed. If the outlet temperature is still unacceptable, recursively split the task and repeat this calculation for estimating the post migration temperature of the target node. The preset heat threshold can be set by a user and can vary for each node. The threshold can be changed and reset anytime during the execution. Task splitting will be discussed in more detail hereafter. If the task cannot be split further, then we select another go back to step 5 and select another target node. If no more target nodes are available, we go back to step 3 and select another task for migration.

Rather than incorporating the estimated impact on temperature and resulting temperature savings while selecting which task to migrate, and its source and destination node, a user may configure some settings to make this estimation a part of the post migration utilization calculation defined in step 5. Thus, the post-migration temperature of the donor and recipient nodes would be estimated as described above in step 5 in addition to the post migration utilization information. Users who prefer this "combined decision-making" would need to set some initial parameters. These parameters include: an acceptable minimum threshold for acceptable temperature reduction and cooling cost savings on the donor node to make a sound decision to move a task, and an acceptable maximum threshold for temperature increase and cooling costs increase on the target node to make a sound decision to move a task. In this combined decision-making way, a user uses this invention with the intent to execute load migration with the primary goal of even load distribution, and secondary goal of ensuring reasonable savings in cooling costs.

Step 6: Load Exchange Protocol.

The next step of the process is establishing a load exchange protocol at each node for governing the number of migrations of target tasks, and ensuring that local independent system load migrations lead to overall system load distribution in the event-driven system (block 42, FIG. 4) and for ensuring that local migrations do not contradict each other.

Since the computer-implemented method is a decentralized process, the load exchange protocol should include three properties, namely, the target task migration should not lead to oscillation, there should not be simultaneous migration of two or more target tasks in a single machine cycle, and load distribution should be improved in some manner as an end result of target task migration. Some or all of these properties should be present and in a preferred embodiment, all of these properties should be present.

Each of these properties now will be discussed in more detail.

If the cost of power has not changed between run-interval previous and run-interval coming up, we don't want oscillation, but if power charges or some other cost factor changes during a large enough time window, then oscillation is legitimate. For instance if in time period t, load is moved from node A to node B, then in time period t+1, it should not be the case that load is shifted back from node B to node A unless sufficient power savings warrant the change. In other words, oscillation is where a task is passed back and forth between the same two nodes more than once as a result of load distribution decisions.

No simultaneous moves should take place. For instance, if task A is moved from node X to node Y, then it should not be the case that downstream tasks connected to A also move at the same time, as this would render the former decision suboptimal.

The end result of the target task migration should be better in some way than the initial configuration assuming that input data rates are not extremely variable between time periods.

In order to achieve these properties, the following local load exchange constraints are defined on each node.

Load shifts should be all downstream or all upstream. All nodes pass tasks to nodes hosting downstream components in the task flow except the nodes hosting the root and the leaves of the flow task graph. Or, conversely, all nodes pass tasks to nodes hosting upstream components of the tasks they are hosting except the nodes hosting the root and the leaves in the flow task graph. Regardless of which direction is selected, all nodes must pass tasks in this direction for a predetermined number of time steps before the direction is reversed. For the nodes hosting the root and the leaves in the task graph, it is recommended that parallel splitting is attempted. This load exchange primitive provides resilience against oscillations because it forces load to be exchanged in one way only.

Figure 9:
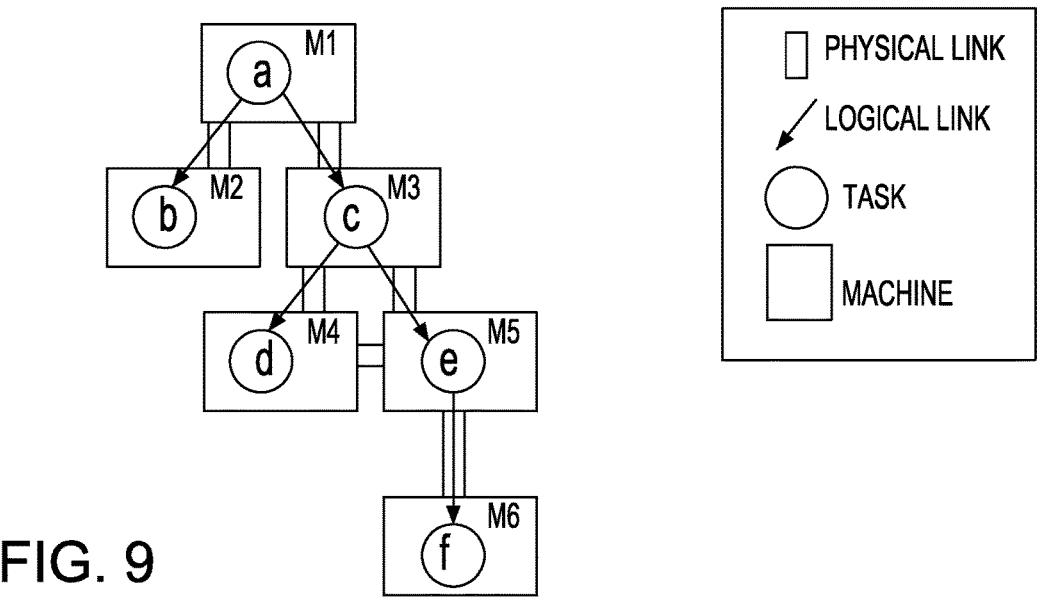
FIG. 9 illustrates the concept of moving one task at a time.

There should be at most one task migration per time step. If a decision is made for a target task to migrate, then none of the tasks downstream in this task's flow and separated from this task by at most one machine link can be moved during the same time step. For instance, as shown in FIG. 9, if it is decided that task c should be moved from M3 to M5, then tasks d and e (which are downstream in task c's flow) cannot move at the same time. After a donor node decides to shift load to a target node, the donor node has to notify all its immediate neighbors, both upstream and downstream. Based on this notification, nodes can decide if they can shift load or not. This load exchange primitive provides resilience against the possibility of simultaneous decisions that contradict each other.

There are constraints on the number of load shifts. After being shifted to a new location, a target task cannot move for a predetermined number of additional time steps. This can also be expressed in terms of the amount of time elapsed since the last time the task was shifted. This load exchange primitive ensures that the system does not spend its entire time on shifting load, and that a significant amount of time is also spent on processing.

Two nodes cannot migrate target tasks to a target node at the same time. For example, if a node B is sending load to its child node C, and node A, who is also node C's parent is trying to also send load to node C, then effectively, node B has a load exchange lock on node C, and node A cannot migrate any task to node C until node B has completed the load migration to node C and released the lock. Without acquiring the target node's load exchange lock, a donor node cannot transfer load to a target node. This load exchange primitive ensures that a recipient node does not become overloaded due to receiving load from other nodes at exactly the same time.

If it is assumed that the input data rates do not fluctuate significantly between two consecutive load shifts, then, due to the factors that are decided in the previous steps of the present computer-implemented method, it can be guaranteed that each local move is optimal. Therefore the configuration of tasks to machines after executing the present computer-implemented process will be more optimal in terms of the available load and memory available to the tasks, and the total response time for the user will be less than what it was in the initial configuration.

Step 7: Migration

In the last step of the process [block 44], the target task is migrated to the target node. Execution of the target task on the target node may then proceed. Thereafter, it may be desirable to collect statistics [block 32] about the execution of the target task on the target node so that if additional adjustments are necessary, another load balancing according to steps 3 through 7 can take place Quiescent Mode Transitions and Power Saving Goals In another alternative embodiment of the present invention [block 46 of FIG. 4], it may be desirable for one or more nodes to go into quiescent mode. There is a decision process involving several factors whether to transition one or more nodes to quiescent mode for a given node. Such a decision may involve migrating any tasks (target task) on the quiescent node (donor node) to another node (target node). These several factors are:

Anticipated traffic and duration of quiescent mode period;
Which other nodes can also transition to quiescent mode;
Evaluate the costs of transitioning to quiescent mode;
Evaluate the benefits of transitioning to quiescent mode; and
Transitioning to quiescent mode should only be made if the benefits of the transition exceed the costs.

If the benefits exceed the cost, the target tasks can then be migrated to the target node and the donor node can transition into quiescent mode to reduce power. Transitioning to quiescent mode can occur before or after load balancing discussed above. Also, transitioning to quiescent mode may occur in place of load balancing.

Each of the above factors will be discussed in detail.

Figure 10:
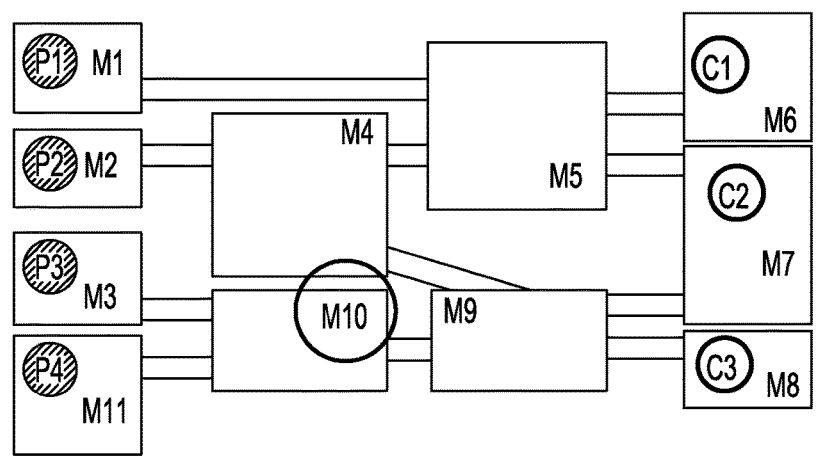
FIGS. 10 to 13 illustrate the embodiment of the present invention where at least one node may go into quiescent mode.

The first factor is the anticipated traffic and duration of quiescent mode period. By analyzing the arrival rate of previously received input data traffic, a node can determine whether there are patterns in the input data traffic. This analysis can include statistical analysis whereby the node can calculate the mean and variance of arrivals and use curve fitting to suggest the distribution of input arrival events. On the basis of this analysis a node can determine a pattern in the arrival rate of its input data and determine the duration of the period it can go into quiescent mode. For example, if no data arrives within a certain period each day, the node can decide to transition to quiescent mode during the period in which no data is expected. The node decides to do this provided that the savings in power resulting from the period of quiescence are greater than or equal to the POWER_DECREASE_THRESHOLD. This situation is shown in FIG. 10. In FIG. 10, node M10 transitions to quiescent mode for a given time duration while the remaining nodes, M4, M9 and M5 continue processing data. Even though node M9 may not receive any incoming data from node M10 since M10 is quiescent, M9 may continue processing data that it received from M10 before M10 transitioned to quiescent mode. M9 may also be processing data it receives from M4 which is physically connected to M9 in the network. The computer-implemented method of the present invention for load distribution which manifests itself as running software on each node refers to the clock to reference the time in order to determine when to transition to quiescent mode and when not to.

Figure 11:
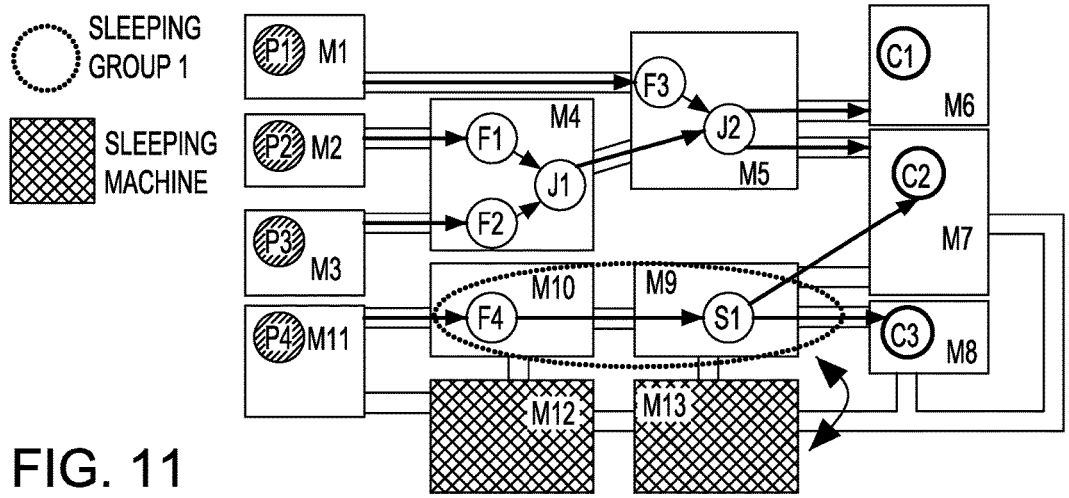
Figure 12:
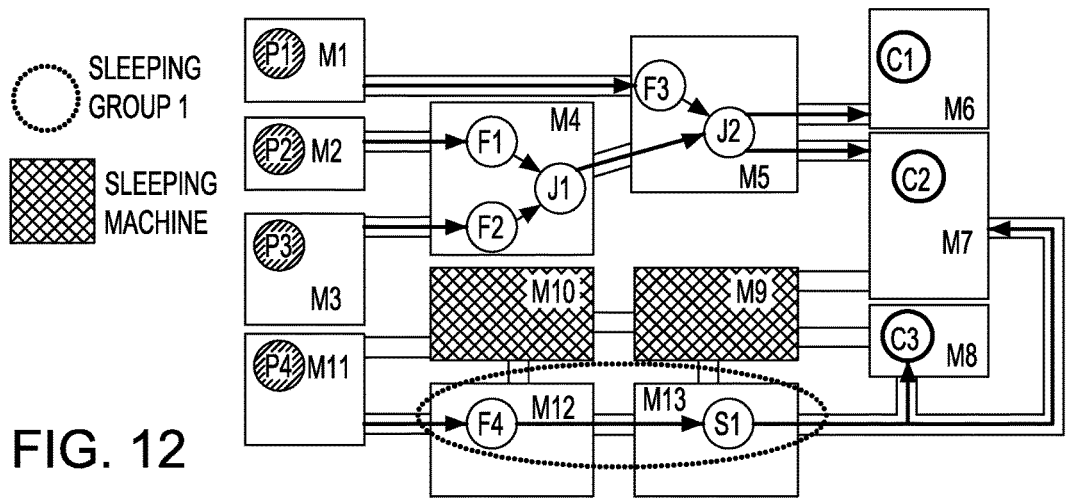

FIGS. 11 and 12 illustrate the situation where a group of nodes, referred to as the set of donor nodes, migrate their tasks and processing to other groups of nodes, referred to as a set of recipient nodes. The recipient nodes must be physically connected to the nodes from which the donor nodes receive input data, and the nodes to which the donor nodes send the output that results from them executing processing tasks on input data. The recipient nodes must also be physically connected to the donor nodes in order to send and receive migrated tasks. The size of the physical connection could be one or more links. The group of donor nodes proceeds to transition to quiescent mode while the group of recipient nodes handles the processing of the migrated tasks. In this case the recipient set of nodes could be superior than the donor set of nodes where superiority could be expressed in terms of processing power, memory space both RAM and on disk, efficiency, default utilization by other task flows they are hosting or any other factor specified by a user of the system. In FIG. 11, as an example of this scenario, a burst of data is expected during a certain period every day by nodes M12 and M13. Nodes M12 and M13 can migrate their tasks and related processing to nodes M10 and M9 which are more efficient at processing this data and utilize overall less energy during the period in which they process the migrated tasks than the donor nodes, and would otherwise remain idle during this period. FIG. 12 illustrates the situation where the task processing is passed back from nodes M10 and M9 to nodes M12 and M13 when the period in input data burst of the migrated tasks is over, and it becomes more energy efficient to conduct processing on M12 and M13.

Another example is if the input data arrives at a very slow rate, i.e it is at or below the BUFFER_RATE_THRESHOLD, a node can choose to be in semi-quiescent mode where it has suspended processing and is buffering input for a certain period, such as the BUFFER_TIME_LIMIT, until it is ready to process the buffered input.

The second factor is which other nodes can also transition to quiescent mode. Given the hierarchical nature of the tasks, if one node goes into quiescent mode, it is likely that downstream nodes, i.e. nodes hosting tasks that rely on the quiescent node's task output as their sole input, can also transition to quiescent mode. An individual node's energy savings may not be significant enough, i.e. may not be greater than a POWER_DECREASE_THRESHOLD to warrant its decision to transition to quiescent mode. In this case a node may consider the collective energy savings of itself and its downstream neighbors resulting from their collective transition to quiescent model, and judge whether the collective energy savings are higher than POWER_DECREASE_THRESHOLD to warrant the transition to quiescent mode. Based on local communication with downstream nodes, a node can determine which other nodes can also transition to quiescent mode at the same time as itself. If a downstream node is not hosting tasks for any other active task flows at the time of this communication, it will be able to transition to quiescent mode at the same time as the node that sent it the communication message.

The third factor is to evaluate the costs of transitioning to quiescent mode. A node can estimate the costs of transitioning to quiescent mode and this estimate includes time costs and business costs. More specifically the costs consist of the following:

The time it takes to suspend current processing and save any necessary in-memory state associated with the processing of a task to disk.

If becoming quiescent involves the decision to migrate tasks, then another cost is the time it takes to migrate a task and its associated state to another node. Assuming all state associated with a task as well as the task itself are local to a node, a node can estimate this cost by first determining the speed and bandwidth of the link used to migrate task and state to a recipient node. In determining which task to migrate and which node to migrate it to, a node can utilize the aforementioned steps 1 through step 6 of this embodiment.

If tasks are migrated and need to be resumed on another node, then another cost is the startup cost of resuming processing of those tasks on another node. This startup cost includes the time to reach the state at which the processing of the task was suspended and resume at that point.

The costs, c, of transitioning to quiescent mode can be calculated quantitatively as a weighted combination of n factors, where factor $f_1$ represents the cost of suspending execution, factor $f_2$ represents the cost of migration and $f_1$ represents another cost factor, and $m_1$ represents the weight on factor $f_1$, $m_2$ represents the weight on factor $f_2$, ... and $m_n$ represents the weight on factor $f_n$:

$$c = \sum_{i=1}^{i \leq n} m_i f_i$$

The fourth factor is evaluating the benefits of transitioning to quiescent mode. The benefits of transitioning to quiescent mode can be evaluated according to two dimensions of energy savings and business cost savings. More specifically the benefits can be estimated by a node as follows:

A node can estimate the energy savings it accumulates for the period during which it plans to be in quiescent mode. This could be in terms of the electricity saved or power saved estimated on the basis of previous energy usage patterns of the node. If tasks are migrated to a more powerful machine, then the portion of the power usage of the recipient machine allocated to these migrated tasks has to be subtracted from the total power savings. The power usage of the migrated task set on node i, where, $C_i$ is the task set that consists of tasks t1, t2 ... tn, where n is the total number of tasks migrated, can be estimated as follows. Let $P_i$ be the rate at which the recipient node i consumes power while performing the task set $C_i$. Example of units for $P_i$ could be Watts per second. $P_i$ can be calculated as follows:

$$P_i = G_i(C_i)$$

The power function $G_i$ takes into account factors such as how often the node has to access the disk for reading and writing as a result of processing a task in task set $C_i$. $G_i$ can be estimated by migrating $C_i$ to node i and recording the amount of power consumption p over a fixed interval of time t where the data rates imposed on the tasks are estimated using aforementioned curve fitting techniques to best match the most recent trend in the incoming data rates. Thus, $G_i$ is:

$$G_i(C_i) = \frac{p}{t}$$

Once $G_i$ is computed, $P_i$ can be estimated, and therefore the power usage of the task set over a time period x is $P_i \cdot x$.

If the transition leads to data to be processed more efficiently then this may lead to lower end-to-end latency for the application. This potential benefit in terms of business cost can be estimated in terms of the end-to-end latency of the tasks.

The benefits, b, of transitioning to quiescent mode can be calculated quantitatively as a weighted combination of n factors, where factor $f_1$ represents energy savings, factor $f_2$ represents end-to-end latency and $f_1$ represents another benefit factor, and $k_1$ represents the weight on factor $f_1$, $k_2$ represents the weight on factor $f_2$, ... and $k_n$ represents the weight on factor $f_n$:

$$b = \sum_{i=1}^{i \leq n} k_i f_i$$

The weights on the factors that determine the costs or benefits could be affine. An affine combination is defined as a linear combination and such that all of the weights in the combination sum to one. The weights could also be a non-linear or constant. In order to extract meaningful values from the cost and benefit equations using specific weights, the numerical values of the factors must be normalized. Normalization is a common practice in statistics.

The decision of transitioning to quiescent mode should only be made if the benefits of the transition exceed the costs. In other words b should be greater than c in order to warrant the transition to quiescent mode.

It should also be noted that the values of the $k_i$ could periodically be updated on nodes. For example, if energy costs vary by time-of-day or day-of-week or seasonally, different values for the weight of energy savings might be applied during the different situations.

Figure 13:
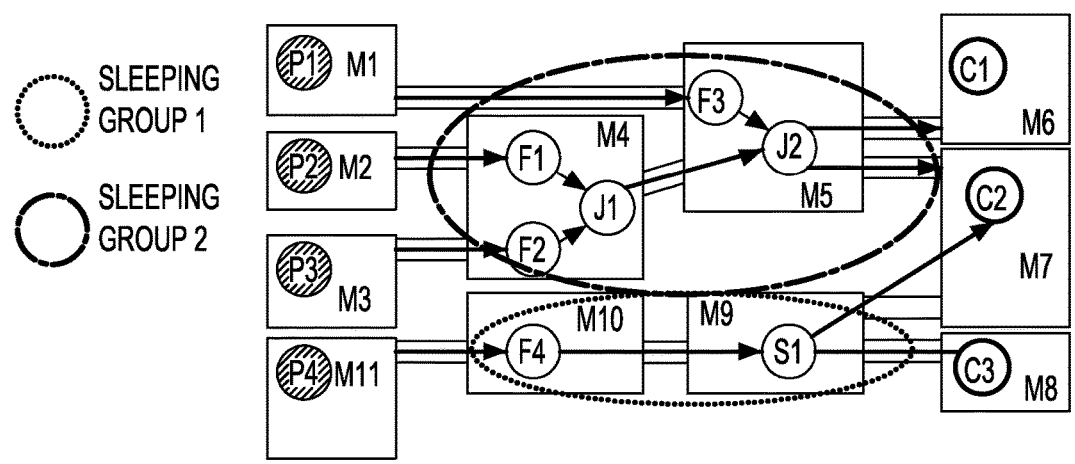

When transitioning to or in quiescent mode, it is important to synchronize quiescent mode period with other nodes. Synchronize means that nodes agree on a fixed time when they together as a group power off and when they together as a group power on again. Since data is flowing from one task to another, it is important and feasible to synchronize quiescent modes between nodes. This is because if an upstream node goes into quiescent mode, then nodes that are downstream in a flow connected to this upstream node can also go into quiescent mode provided that they are not hosting tasks belonging to other flows, or if the downstream nodes are hosting tasks belonging to other flows, the downstream nodes can go into quiescent mode if upstream nodes in all the different data flows they are hosting transition to quiescent mode as well. This situation is shown in FIG. 13. In FIG. 13 node M4 decides to transition to quiescent mode and broadcasts this message to its downstream nodes. The downstream node M5 of M4 also decides to transition to quiescent mode because it realizes that during the period in which M4 is quiescent, it cannot receive any data from M4 and it calculates that it will not receive data from M1 on the basis of data pattern analysis and prediction. M5 also does not have any remaining processing to conduct from previously received input data. Therefore node M4 synchronizes the length of its quiescent mode period with node M5 and both transition to quiescent mode for an agreed period of time. Similarly, in FIG. 13, when node M10 decides to transition to quiescent mode and broadcasts this message to its downstream nodes, node M9 realizes that it cannot receive any data during the period in which node M10 is quiescent and it does not have any remaining processing to conduct. Therefore M10 synchronizes its quiescent mode period with node M9 and both transition to quiescent mode for an agreed period of time. The power costs of transitioning to quiescent state may be different for different nodes. When deciding whether to transition to quiescent mode, a node estimates this cost of turning itself off and subtracts it from the estimated power savings.

Following is a table of all the user set parameters defined in the present invention. The parameters in the table can be configured individually for each node by a user at any point in time. A node may have multiple users. Alternatively if the network is very large (E.g. thousands of nodes) a user may initialize the load migration trigger settings for a subset of the nodes, and rely on autonomic, decentralized information propagation algorithms such as basic diffusion or belief propagation for the initialized nodes to spread their initialized values to other nodes for which those thresholds are appropriate. Diffusion is a technique in which a net transport of information results from a set of nodes in the network where it is highly concentrated to a set of nodes which have little or none of the information. The result of diffusion is a gradual mixing of information. Under certain conditions, based on purely self-initiated local coordination of nodes, the diffusion process will eventually result in complete mixing of information in the network.

| Name of Variable | Meaning of Variable | Sample Value |
|---|---|---|
| HISTORY_NUMBER_OF_INTERVALS_TRACKED | Statistics recorded at a server for the execution of tasks assigned to it and event input-output from those tasks are aggregated, with calculation of median values, standard deviation, etc. over this number of monitoring cycles. This number HISTORY_NUMBER_OF_INTERVALS_TRACKED, minus the value of HISTORY_INTERVAL_COUNT_CLEANUP_SIZE, should be large enough to allow the load-distribution software to notice periodic patterns in event traffic and task resource utilization, but not so large as to put a major burden on the node in terms of amount of statistical data needing to be retained. Also, the logic for reducing (deleting old) statistics is executed every HISTORY_NUMBER_OF_INTERVALS_TRACKED monitoring intervals. | 40 |
| HISTORY_INTERVAL_COUNT_CLEANUP_SIZE | Presuming that it is cheaper to remove older statistics in sets, not to remove one old set of statistics when a new one is ready to be saved, this integer will specify the number of statistical sets to be removed each time the historical statistics are reduced in volume. | |
| LOAD_DISTRIBUTION_INTERVAL | Length of episodic interval after which load distribution is considered in a node | 10 seconds |
| STATE_MIGRATION_LIMIT | Maximum amount of task related state that can be migrated | 1 GB |
| LOAD_DECREASE_THRESHOLD | Minimum amount of hypothetical percentage decrease in post migration utilization of a donor node resulting from the proposed migration of a task to support the migration. | 20% |
| LOAD_INCREASE_THRESHOLD | Maximum allowable amount of hypothetical percentage increase in post migration utilization of a recipient node resulting from the proposed migration of a task to support the migration. | 10% |
| LOAD_MAX_THRESHOLD | Maximum acceptable load on a node expressed as a percentage of the node's total load capacity. | 70% |
| TEMPERATURE_INCREASE_THRESHOLD | Maximum allowable amount of hypothetical percentage increase in post migration temperature of a recipient node resulting from the proposed migration of a task to support the migration. | 20% |
| TEMPERATURE_DECREASE_THRESHOLD | Minimum amount of hypothetical percentage decrease in post migration temperature of a donor node resulting from the proposed migration of a task to support the migration. | 10% |
| BUFFER_RATE_THRESHOLD | If the incoming input data rates are below this rate, a node should transition to semi-quiescent mode where it buffers input and suspends processing | 10 messages per second |

-continued

| Name of Variable | Meaning of Variable | Sample Value |
|---|---|---|
| BUFFER_TIME_LIMIT | The maximum duration of a period during which a node buffers input. | 10 seconds |
| POWER_DECREASE_THRESHOLD | Minimum amount of hypothetical percentage decrease in power consumption of a node resulting from its transition to quiescent mode. | 10% |
| $m_1, m_2, \ldots m_n$, where n is the total number of factors | Weights on factors in estimating total cost of transitioning to quiescent mode | All weights constant at 1. |
| $k_1, k_2, \ldots k_n$, where n is the total number of factors | Weights on factors estimating total benefits of transitioning to quiescent mode | All weights constant at 1. |

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any non-transitory tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. A cloud computing environment is also envisioned for the present invention.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

We claim:

1. A method of decentralized load distribution in an event-driven system, the method comprising the steps of:
receiving a data flow to be processed by a plurality of tasks at a plurality of nodes in the event-driven system having stateful and stateless event processing components, wherein the plurality of tasks are selected from the group consisting of hierarchical tasks, wherein a hierarchical task is a task that is dependent on the output of another task, nonhierarchical tasks, wherein a nonhierarchical task is a task that is not dependent on the output of another task, and mixtures thereof;
collecting statistics about each task hosted at each node;
creating a list of neighbor nodes, using the collected statistics, to which a task can be partially or wholly transferred;
selecting at least one node, known as the donor node, to transition into quiescent mode, wherein the step of selecting at least one node to transition into quiescent mode comprises:
  analyzing the incoming traffic and expected duration of a quiescent mode period at the donor node;
  evaluating other nodes that can also transition into quiescent mode;
  evaluating the latency and power/cooling costs at the donor node of transitioning into quiescent mode; and
  evaluating the power/cooling benefits at the donor node of transitioning into quiescent mode; and
  migrating the target tasks from the donor node to the target node and transitioning the donor node into quiescent mode if the benefits of transitioning to quiescent mode exceed the costs of transitioning to quiescent mode;
selecting the tasks at the donor node for consideration to migrate, known as the target tasks, to a neighbor node, known as the target node, from the list of neighbor nodes;
choosing the target node to which the target tasks can be migrated wherein the target node meets predetermined criteria in terms of load distribution quality;
establishing a load exchange protocol at each node for governing the number of migrations of target tasks, wherein decentralized load migrations lead to overall system load distribution in the event-driven system;
migrating the target tasks from the donor node to the target node and transitioning the donor node into quiescent mode.

2. The method of claim 1 further comprising splitting the target tasks into 2 or more groups of target subtasks.

3. A method of decentralized load distribution in an event-driven system, the method comprising the steps of:
- receiving a data flow to be processed by a plurality of tasks at a plurality of nodes in the event-driven system having stateful and stateless event processing components, wherein the plurality of tasks are selected from the group consisting of hierarchical tasks, wherein a hierarchical task is a task that is dependent on the output of another task, nonhierarchical tasks, wherein a nonhierarchical task is a task that is not dependent on the output of another task, and mixtures thereof;
- collecting statistics about each task hosted at each node;
- creating a list of neighbor nodes, using the collected statistics, to which a task can be partially or wholly transferred;
- selecting at least one node, known as the donor node, to transition into quiescent mode;
- selecting the tasks at the donor node for consideration to migrate, known as the target tasks, to a neighbor node, known as the target node, from the list of neighbor nodes;
- choosing the target node to which the target tasks can be migrated wherein the target node meets predetermined criteria in terms of load distribution quality, wherein the predetermined criteria in terms of load distribution quality comprises:
  - (i) the target node must be physically connected to: (a) the node hosting the target task, (b) a node hosting a task that is a parent to the target task, and (c) a node hosting a task that is a child to the target task;
  - (ii) the target node must have sufficient available load and memory to host the target task;
  - (iii) minimizing the number of physical links in the data flow which passes through the target task;
  - (iv) eliminating cycles;
  - (v) target node should have negative load correlation coefficient; and
  - (vi) post-migration utilization of the node hosting the target task and the target node are less than a predetermined maximum threshold value;
- establishing a load exchange protocol at each node for governing the number of migrations of target tasks, wherein decentralized load migrations lead to overall system load distribution in the event-driven system;
- migrating the target tasks from the donor node to the target node and transitioning the donor node into quiescent mode.

4. The method of claim 1 wherein the load exchange protocol comprises:
- (i) a decision to migrate the target task should not lead to oscillation;
- (ii) no simultaneous migrations of 2 or more tasks to a single target node in a single machine cycle shall occur;
- (iii) no simultaneous migrations of 2 or more tasks from a node in a single machine cycle shall occur; and
- (iii) an end result of target task migration should improve load distribution in some manner.

5. A method of decentralized load distribution in an event-driven system, the method comprising the steps of:
- receiving a data flow to be processed by a plurality of tasks at a plurality of nodes in the event-driven system having stateful and stateless event processing components, wherein the plurality of tasks are selected from the group consisting of hierarchical tasks, wherein a hierarchical task is a task that is dependent on the output of another task, nonhierarchical tasks, wherein a nonhierarchical task is a task that is not dependent on the output of another task, and mixtures thereof;
- collecting statistics about each task hosted at each node;
- creating a list of neighbor nodes, using the collected statistics, to which a task can be partially or wholly transferred;
- selecting at least one node, known as the donor node, to transition into quiescent mode;
- selecting the tasks at the donor node for consideration to migrate, known as the target tasks, to a neighbor node, known as the target node, from the list of neighbor nodes;
- choosing the target node to which the target tasks can be migrated wherein the target node meets predetermined criteria in terms of load distribution quality;
- establishing a load exchange protocol at each node for governing the number of migrations of target tasks, wherein decentralized load migrations lead to overall system load distribution in the event-driven system;
- migrating the target tasks from the donor node to the target node and transitioning the donor node into quiescent mode;
- wherein each node has the following load exchange constraints:
  - (i) during a first predetermined period of time, all target tasks are migrated either upstream or downstream and after a second predetermined period of time, the direction of target task migration may be switched;
  - (ii) if a target task is migrated to a target node, then any nearest neighbor downstream target tasks prior to the migration cannot be migrated for a predetermined amount of time;
  - (iii) after migration to a target node, a target task must remain at the target node for a predetermined amount of time; and
  - (iv) two nodes cannot migrate target tasks to a target node at the same time.

6. The method of claim 1 further comprising the step of collecting statistics about the execution of the target tasks on the target node.

7. A computer program product comprising:
- a non-transitory computer recordable storage medium having computer readable program code for decentralized load distribution in an event-driven system comprising:
- computer readable program code configured for receiving a data flow to be processed by a plurality of tasks at a plurality of nodes in the event-driven system having stateful and stateless event processing components, wherein the plurality of tasks are selected from the group consisting of hierarchical tasks, wherein a hierarchical task is a task that is dependent on the output of another task, nonhierarchical tasks, wherein a nonhierarchical task is a task that is not dependent on the output of another task, and mixtures thereof;
- computer readable program code configured for collecting statistics about each task hosted at each node;
- computer readable program code configured for creating a list of neighbor nodes, using the collected statistics, to which a task can be partially or wholly transferred;
- computer readable program code configured for selecting at least one node, known as the donor node, to transition into quiescent mode, wherein computer readable program code configured for selecting at least one node to transition into quiescent mode comprises:

computer readable program code configured for analyzing the incoming traffic and expected duration of a quiescent mode period at the donor node;
computer readable program code configured for evaluating other nodes that can also transition into quiescent mode;
computer readable program code configured for evaluating the latency and power/cooling costs at the donor node of transitioning into quiescent mode; and
computer readable program code configured for evaluating the power/cooling benefits at the donor node of transitioning into quiescent mode; and
computer readable program code configured for migrating the target tasks from the donor node to the target node and transitioning the donor node into quiescent mode if the benefits of transitioning to quiescent mode exceed the costs of transitioning to quiescent mode;
computer readable program code configured for selecting the tasks at the donor node for consideration to migrate, known as the target tasks, to a neighbor node, known as the target node, from the list of neighbor nodes;
computer readable program code configured for choosing the target node to which the target tasks can be migrated wherein the target node meets predetermined criteria in terms of load distribution quality;
computer readable program code configured for establishing a load exchange protocol at each node for governing the number of migrations of target tasks, wherein decentralized load migrations lead to overall system load distribution in the event-driven system;
computer readable program code configured for migrating the target tasks from the donor node to the target node and transitioning the donor node into quiescent mode.

8. A computer program product comprising:
a non-transitory computer recordable storage medium having computer readable program code for decentralized load distribution in an event-driven system comprising:
computer readable program code configured for receiving a data flow to be processed by a plurality of tasks at a plurality of nodes in the event-driven system having stateful and stateless event processing components, wherein the plurality of tasks are selected from the group consisting of hierarchical tasks, wherein a hierarchical task is a task that is dependent on the output of another task, nonhierarchical tasks, wherein a nonhierarchical task is a task that is not dependent on the output of another task, and mixtures thereof;
computer readable program code configured for collecting statistics about each task hosted at each node;
computer readable program code configured for creating a list of neighbor nodes, using the collected statistics, to which a task can be partially or wholly transferred;
computer readable program code configured for selecting at least one node, known as the donor node, to transition into quiescent mode;
computer readable program code configured for selecting the tasks at the donor node for consideration to migrate, known as the target tasks, to a neighbor node, known as the target node, from the list of neighbor nodes;
computer readable program code configured for choosing the target node to which the target tasks can be migrated wherein the target node meets predetermined criteria in terms of load distribution quality, wherein the predetermined criteria in terms of load distribution quality comprises:
(i) the target node must be physically connected to: (a) the node hosting the target task, (b) a node hosting a task that is a parent to the target task, and (c) a node hosting a task that is a child to the target task;
(ii) the target node must have sufficient available load and memory to host the target task;
(iii) minimizing the number of physical links in the data flow which passes through the target task;
(iv) eliminating cycles;
(v) target node should have negative load correlation coefficient; and
(vi) post-migration utilization of the node hosting the target task and the target node are less than a predetermined maximum threshold value;
computer readable program code configured for establishing a load exchange protocol at each node for governing the number of migrations of target tasks, wherein decentralized load migrations lead to overall system load distribution in the event-driven system;
computer readable program code configured for migrating the target tasks from the donor node to the target node and transitioning the donor node into quiescent mode.

9. The computer program product of claim 7 wherein the load exchange protocol comprises:
(i) a decision to migrate the target task should not lead to oscillation;
(ii) no simultaneous migrations of 2 or more tasks to a single target node in a single machine cycle shall occur;
(iii) no simultaneous migrations of 2 or more tasks from a node in a single machine cycle shall occur; and
(iii) an end result of target task migration should improve load distribution in some manner.

10. A computer program product comprising:
a non-transitory computer recordable storage medium having computer readable program code for decentralized load distribution in an event-driven system comprising:
computer readable program code configured for receiving a data flow to be processed by a plurality of tasks at a plurality of nodes in the event-driven system having stateful and stateless event processing components, wherein the plurality of tasks are selected from the group consisting of hierarchical tasks, wherein a hierarchical task is a task that is dependent on the output of another task, nonhierarchical tasks, wherein a nonhierarchical task is a task that is not dependent on the output of another task, and mixtures thereof;
computer readable program code configured for collecting statistics about each task hosted at each node;
computer readable program code configured for creating a list of neighbor nodes, using the collected statistics, to which a task can be partially or wholly transferred;
computer readable program code configured for selecting at least one node, known as the donor node, to transition into quiescent mode;;
computer readable program code configured for selecting the tasks at the donor node for consideration to migrate, known as the target tasks, to a neighbor node, known as the target node, from the list of neighbor nodes;
computer readable program code configured for choosing the target node to which the target tasks can be migrated wherein the target node meets predetermined criteria in terms of load distribution quality;
computer readable program code configured for establishing a load exchange protocol at each node for governing the number of migrations of target tasks, wherein decentralized load migrations lead to overall system load distribution in the event-driven system;
computer readable program code configured for migrating the target tasks from the donor node to the target node and transitioning the donor node into quiescent mode, wherein each node has the following load exchange constraints:
  (i) during a first predetermined period of time, all target tasks are migrated either upstream or downstream and after a second predetermined period of time, the direction of target task migration may be switched;
  (ii) if a target task is migrated to a target node, then any nearest neighbor downstream target tasks prior to the migration cannot be migrated for a predetermined amount of time;
  (iii) after migration to a target node, a target task must remain at the target node for a predetermined amount of time; and
  (iv) two nodes cannot migrate target tasks to a target node at the same time.

11. The computer program product of claim 7 further comprising computer readable program code configured for collecting statistics about the execution of the target tasks on the target node.

* * * * *